Sept. 22, 1931.  H. W. NIEMAN ET AL  1,823,912
CLUTCH
Filed Nov. 26, 1929
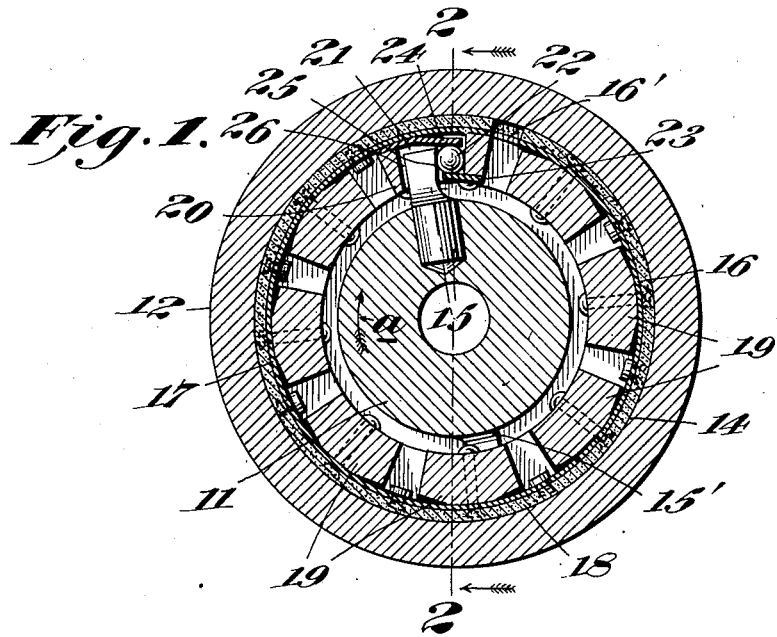
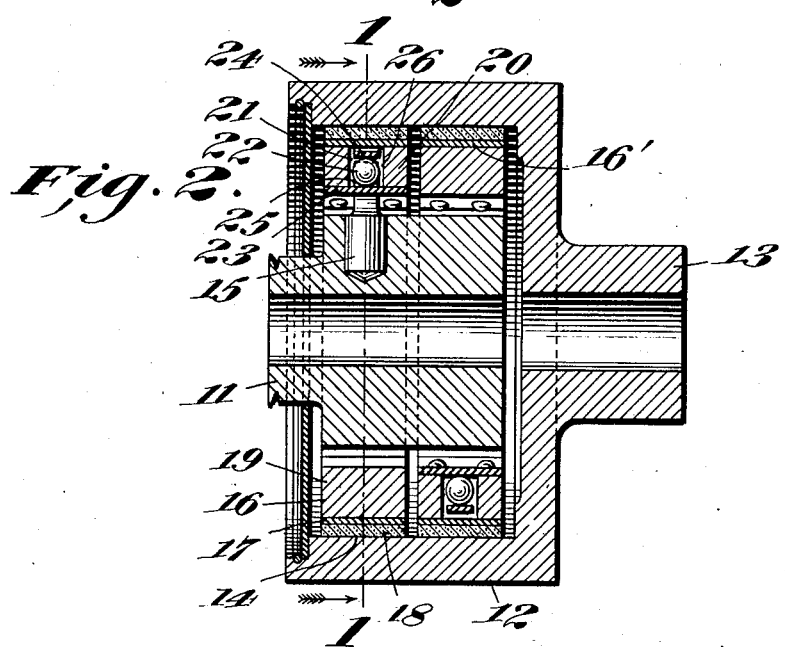
Inventors
Henry W. Nieman
and James P. Madden.
By R. S. A. Dougherty.
Attorney Patented Sept. 22, 1931

1,823,912

UNITED STATES PATENT OFFICE

HENRY W. NIEMAN AND JAMES P. MADDEN, OF BETHLEHEM, PENNSYLVANIA, ASSIGNORS TO BETHLEHEM STEEL COMPANY, A CORPORATION OF PENNSYLVANIA

CLUTCH

Application filed November 26, 1929. Serial No. 409,800.

Our invention relates to clutches of the type involving the use of a centrifugally actuated flexible friction band adapted to engage the cylindrical bearing surface of a drum like member. More particularly our invention is directed to the means of connecting the driving member to said band.

The invention can probably best be understood by describing a specific embodiment thereof.

Accordingly, referring to the drawings which form a part of this specification:

Fig. 1 is a cross section taken on the line 1—1 of Fig. 2; and

Fig. 2 is a longitudinal section taken on the line 2—2 of Fig. 1.

Member 11, hereinafter referred to as a rotary member, is adapted to be fixed to a shaft receiving power from the motor which is to be used as the driver. Drum 12, provided with hub 13, is adapted to be fixed to the driven shaft. This drum member is provided with the internal cylindrical bearing surface 14. In a recess disposed substantially radially of member 11 is fixed pin 15, the outer portion of which is adapted to be tractively connected to the end of a flexible friction member 16.

Flexible friction member 16 comprises a flexible steel band 17 to one side of which is secured a facing 18 of suitable friction material. To the other side of band 17 are weights 19 distributed rather closely together along the band and substantially the same distance apart.

Diametrically opposite to pin 15 on rotary member 11 is secured another pin 15', but in a different lateral plane. This pin is connected to flexible friction device 16' similar to the way in which pin 15 is secured to flexible member 16. The structure of these friction members are similar in all respects. By employing two of these members instead of one, disposed as shown, better balance is secured during operation.

Upon rotating rotary member 11 in the direction of arrow $a$ the flexible friction devices will be thrown outwardly centrifugally to frictionally engage the internal cylindrical bearing surfaces of drum 12 to effect a clutching action between the driving and driven shafts. The structure thus briefly indicated forms no part of the invention to be claimed herein. The features which do constitute the invention of this particular application involve the structure whereby the flexible friction members are connected to the driving member 11. This structure will now be described.

Weight 20 at one of the ends of the flexible friction member is provided with a recess 21. This recess is adapted to receive the outer end of pin 15. This recess is of considerably greater diameter than the diameter of the pin end, to provide for the presence of a bearing body 22 placed between one side of the pin and the front side of recess 21. This body is of spherical form and is retained in the recess by plate 23 secured to weight 20 and projecting over a portion of said recess, on one side, and by spring 24 secured to the steel band 17 the end of which engages body 22 on the side opposite to the projecting portion of plate 23.

Pin 15 has a lateral flattened portion 25 adapted to engage body 22.

Recess 21 is of such a size relative to the portion of pin 15 received thereby that when member 11 is rotating and traction on the flexible friction member is being exerted by pin 15, this pin then bearing against body 22, there will be a small space between the remaining portions of the pin end and the walls of the recess as indicated by reference to numeral 26.

The utility of the structure thus described will be readily apparent. While it is desired, with clutches of the character disclosed, to have the driving member 11 and driven member 12 coaxial, it is frequently impossible to have such a relationship absolute without requiring an undue amount of care in setting up the apparatus and maintaining it in such relationship during operation. In actual practice the coaxial relationship will frequently only be approximate, the axes of the members either being out of line because of one axis being displaced laterally with relation to the other or because of an inclination of the axes to each other, or because of a combination of these conditions. Obviously under such departures from an absolute coaxial relationship between these members the distance between the cylindrical surface of member 11 and the inner cylindrical surface of drum 12 will vary or there will be an alteration in the angular relationship of such surfaces or both.

By the special means of connection between pin 15 and flexible friction member 16 the deleterious effects of such departure may be largely obviated. Because of the amount of play that is allowed between pin 15 and the walls of the recess 21 and because of the fact that body 22 will rock or rotate readily as the distance between the surfaces of the driving and driven member changes, the pin 15 will move radially with reference to such device while still maintaining its tractive connection thereto. Such movement obviously can have little or no effect in weakening the connection and there will be a minimum of wear. This type of connection likewise takes care of the condition where the axes of the driving and driven members 11 and 12 are somewhat inclined to each other.

Having thus described our invention what we claim and desire to secure by Letters Patent is:

1. In a device of the class described, a rotatable cylindrical drum, a rotatable member in approximately coaxial relationship with said drum, a flexible friction member adapted to wrappingly engage the cylindrical surface of said drum, a pin disposed radially of said members, fixed at one end to one of said members and at its other end tractively but loosely connected to the other of said members, and a curved bearing body disposed between a portion of said last mentioned member and said pin and laterally of said pin.

2. In a device of the class described, a rotatable cylindrical drum, a rotatable member disposed approximately coaxial to said drum, a pin secured at one end to said rotatable member and extending radially therefrom, a weighted flexible friction device adapted to wrappingly engage the cylindrical surface of said drum, and having a recess at one end adapted to receive the outer end of said pin, a curved body disposed between the flexible friction member and the outer end of said pin and being disposed laterally of and in advance of said pin, said recess in said flexible friction member being of sufficient size to allow a moderate degree of play therein of the end of said pin.

3. In a device of the class described, a rotatable cylindrical drum, a rotatable member disposed approximately coaxial to said drum, a pin secured at one end to said rotatable member and extending radially therefrom, a flexible friction device adapted to wrappingly engage the cylindrical surface of said drum, and having a recess at one end adapted to receive the outer end of said pin, a body disposed between said pin and said flexible friction element and disposed laterally and in advance of said pin, the surfaces of said body being curved where they engage said flexible friction element and said pin to permit a rocking motion.

4. In a device of the class described, a rotatable cylindrical drum, a rotatable member disposed approximately coaxial to said drum, a pin secured at one end to said rotatable member and extending radially therefrom, a flexible friction device adapted to wrappingly engage the cylindrical surface of said drum, and having a recess at one end adapted to receive the outer end of said pin, a spherical body disposed between said pin and said flexible friction member and disposed laterally and in advance of said pin.

5. In a device of the class described, a rotatable cylindrical drum, a rotatable member disposed approximately coaxial with said drum, a pin secured at one end to said rotatable member and extending radially therefrom, said pin having a flattened portion adjacent its other end, a flexible friction member adapted to wrappingly engage the cylindrical surface of said drum, said flexible friction member having a recess near one end adapted to receive one end of said pin and a rocking member disposed between the flattened portion of said pin and a side of said recess of the flexible friction member, said recess being of sufficient size to allow a restricted play between said friction member and said pin.

In testimony whereof we hereunto affix our signatures.

HENRY W. NIEMAN.
JAMES P. MADDEN.